Patented Jan. 27, 1925.

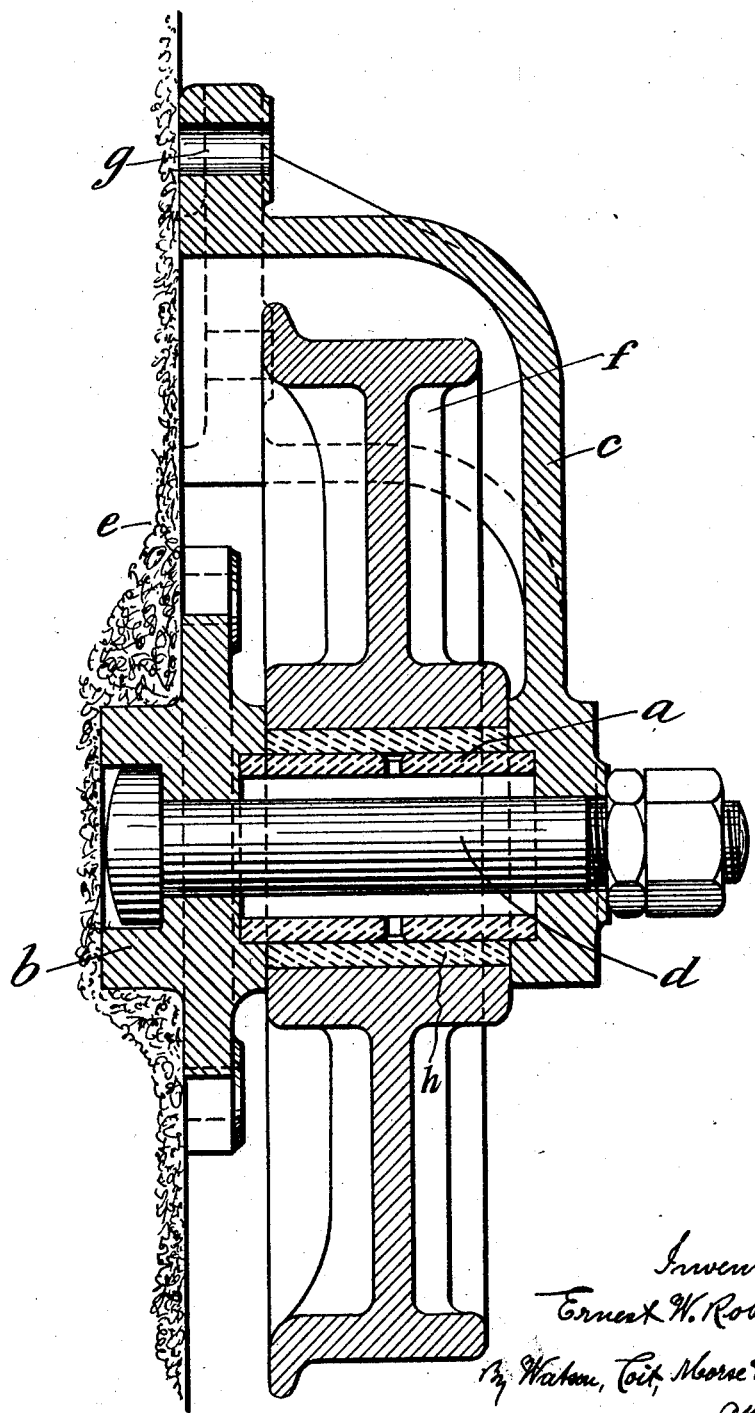

1,524,152

UNITED STATES PATENT OFFICE.

ERNEST WILLIAM ROBEY, OF LONDON, ENGLAND.

SPROCKET WHEEL FOR ASH CONVEYERS AND THE LIKE.

Application filed May 11, 1922. Serial No. 560,140.

*To all whom it may concern:*

Be it known that I, ERNEST WILLIAM ROBEY, a subject of the King of Great Britain, residing in London, England, have invented certain new and useful Improvements Relating to Sprocket Wheels for Ash Conveyers and the like, of which the following is a specification.

In apparatus such as an ash conveyer in which a sprocket wheel or roller has to turn in water carrying grit in suspension, there is difficulty in preventing entry of grit into the journal.

By this invention the journal comprises a bush, preferably of hardened steel, clamped between two castings and engaged in circular recesses in said castings. One of these castings has the form of a bracket depending from the side of the trough containing the water and projecting from the side sufficiently to accommodate the bush between itself and the other casting which may also be fastened to the side of the trough. The bracket is conveniently so extended that it forms a cover for the sprocket wheel or roller, thus protecting the latter from matter, such as ashes and clinker, being delivered to the conveyer; a sector shape is suitable. The sprocket wheel may be bushed with a hardened steel bush. Lubrication may be by means of a passage through one of the clamping plates, for instance by means of a Stauffer lubricator.

The accompanying drawing illustrates the invention, being an axial section through a roller supported and protected in accordance with the invention and adapted to guide a sprocket wheel chain.

The bush $a$ of hardened steel is clamped between the castings $b$ and $c$ by means of the bolt $d$. The casting $b$ is fixed to the side $e$ of the trough; the casting $c$ is in the form of a sector-shaped hood, covering the upper part of the roller $f$ and bolted to the side $e$ at a place above the roller, as at $g$, so that it depends in the manner of a bracket. The roller has a hardened steel bush $h$.

Having thus described the nature of the said invention and the best means I know of carrying the same into practical effect, I claim:—

1. In an ash conveyer comprising a trough, a sprocket wheel, a plate fixed to the inner surface of the side of said trough, a bracket depending from the said surface, a bush constituting the journal for said sprocket wheel and extending between the said plate and said bracket, recesses in said plate and said bracket adapted to engage and support the ends of said bush, and a bolt extending through the said plate and bracket, and adapted to clamp the bush between the bracket and the plate.

2. In an ash conveyer comprising a trough, a sprocket wheel, a plate fixed to the inner surface of the side of said trough, a hood-shaped bracket depending from the said surface, a bush constituting the journal for said sprocket wheel and extending between the said plate and said bracket, recesses in said plate and said bracket adapted to engage and support the ends of said bush, and a bolt extending through the said plate and bracket, and adapted to clamp the bush between the bracket and the plate.

In testimony whereof I have signed my name to this specification.

ERNEST WILLIAM ROBEY.